(12) United States Patent
Mueck et al.

(10) Patent No.: US 6,703,961 B2
(45) Date of Patent: Mar. 9, 2004

(54) SERIAL INTERFACE FOR AN ANALOG TO DIGITAL CONVERTER AND A CONVERTER INCLUDING SUCH AN INTERFACE

(75) Inventors: Michael Mueck, Andover, MA (US); David Gerrard Laing, Newbury (GB); Alain Valentin Guery, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/128,033

(22) Filed: Apr. 23, 2002

(65) Prior Publication Data

US 2003/0197635 A1 Oct. 23, 2003

(51) Int. Cl.[7] .................................................. H03M 1/38
(52) U.S. Cl. ........................................ 341/161; 341/155
(58) Field of Search ................................. 341/161, 155, 341/122, 123, 162

(56) References Cited

U.S. PATENT DOCUMENTS 5,663,729 A * 9/1997 Wada et al. ................ 341/155

* cited by examiner

Primary Examiner—Brian Young
Assistant Examiner—Joseph Lauture
(74) Attorney, Agent, or Firm—Wolf, Greenfield & Sacks, P.C.

(57) ABSTRACT

An analog to digital converter is provided which has a compact serial interface utilising only four pins to define chained and non chained modes of operation. Further more the interface also allows the converter to be configured to indicate immediately that the conversion has been completed. Another variant of the invention enables an analog to digital converter to be provided having only a 3 pin serial interface.

51 Claims, 7 Drawing Sheets ns

US 6,703,961 B2

SERIAL INTERFACE FOR AN ANALOG TO DIGITAL CONVERTER AND A CONVERTER INCLUDING SUCH AN INTERFACE

FIELD OF THE INVENTION

The present invention relates to a serial interface suitable for use in an analog to digital converter and to a converter including such an interface. The interface may be used in other devices as well. In particular, the present invention relates to a compact serial interface which enables multiple analog to digital converters to be controlled via an interface comprising only three or four pins. The present invention also relates to a serial interface for a device, such as an analog to digital converter, which enables operation of the device to be controlled and a "result ready" signal to be asserted using only three pins.

BACKGROUND OF THE INVENTION

It is desired that analog to digital converters, along with many other semiconductor devices, should be implemented in increasingly compact forms. This effects not only the package size of the integrated circuit, but also the number of connections which must be made to it across a printed circuit board. Reducing the number of connections allows more devices to be populated within a given area of circuit board, or alternatively mitigates the need to go to more complex circuit board technologies such as multi-layered boards. It is also desirable that new devices can offer enhanced functionality over older devices, whilst still being able to operate in legacy modes of operation where they reproduce the functionality of earlier devices. Where a device is to be a direct replacement for an earlier design, it is constrained by the pin configuration of that earlier device and hence any new functionality can only be achieved using the same device pin-out.

SUMMARY OF THE INVENTION

According to a first aspect of the present invention, there is provided an analog to digital converter comprising a converter section and an interface section, the interface section having a first input and an output from which a digital word representing the result of the conversion can be read, and wherein in a first mode of operation the output is placed into a predetermined output state to signal that the conversion has been completed, and in which the first mode is selected by placing the first input into a first predetermined state before the conversion is complete.

It is thus possible to provide an analog to digital converter (ADC or A/D converter) which, in a first mode of operation, asserts a "result obtained" signal on its output pin as soon as the conversion has been completed provided the signal at the first input pin thereof is in a predetermined state.

It will be appreciated by the person skilled in the art that in this mode of operation the first input is acting as a chip select input. The chip select input can be active high or low. Where the input is active low, it is traditional to signify this by placing an "bar" over the letters, thus an active low chip select input is designated $\overline{CS}$, or in textural form CSB. Both designations will be used herein.

Advantageously in one embodiment of the invention the first input acts as a chip select input when the first input is in the first predetermined state, and the first input acts to signal that a conversion is to be commenced upon a transition from the first to the second predetermined state.

The A/D converter examines the status of the first input relative to the generation of an internal "end of convert" (EOC) signal and outputs a result obtained signal when the conversion is finished if the chip select signal was asserted (active) before the conversion was complete. This mode of operation can be considered as a "chip select, ready" mode. If the first input is not in the predetermined state when the conversion is complete then the output remains in a high impedance state until such time as the chip select signal is issued. This can be regarded as a second mode, which for convenience can be referred to as a "chip select, no-ready" mode.

Preferably in a further embodiment of an A/D converter, the converter further includes a second input for initiating a conversion.

Advantageously a conversion is started in response to a predetermined transition of a signal applied to the second input.

Preferably the analog to digital converter further comprises a clock input and the conversion result is output from the A/D converter in response to transitions of the clock signal at the clock input between a first and second predetermined state. Advantageously in each complete clock cycle only one bit of the conversion result is output from the A/D converter. Thus a device responsive to the A/D converter can control the rate at which it receives data from the converter.

In a preferred embodiment of the present invention there is provided an analog to digital converter in which the analog to digital converter comprises a first input, a second input and a serial clock input, and wherein following the initiation of a conversion by applying a start of convert signal to the second input the converter examines the status of its first input and the serial clock, and if the first input is in a first predetermined state and the serial clock is in a first predetermined serial clock state, then the analog to digital converter enters a third mode where the output is asserted to a third mode predetermined output state to signal that a conversion has been completed when the conversion has been completed and the first input is in a second predetermined state.

Preferably the third mode predetermined output state is the same signal state as the second predetermined state of the first input.

This has the advantage that multiple A/D converters may be connected in a chained fashion, with the output pin of one A/D converter being connected to the first input of a succeeding A/D converter, and the output of the final A/D converter will only be asserted when each and every one of the converters in the chain has completed its conversion.

Advantageously the A/D converters are asynchronous. In this context, this means that the A/D converters perform their analog to digital conversions on the basis of internally set timings and are not tied to a system clock. This is advantageous when performing high resolution and/or high accuracy conversions since it means that a system clock signal need not be provided to the or each converter. The system clock can, from an A/D converter's perspective, be regarded as an electrically noisy signal which may leak through the circuitry of the analog to digital converter and degrade the final conversion result in terms of resolution and/or accuracy.

It is thus possible to provide an interface for an analog to digital converter, and an A/D converter having such an interface, wherein in the third mode of operation (which may be referred to as a "chain, ready" mode) the A/D converter can indicate when it has finished an analog to digital conversion, and wherein these signals can be chained through a plurality of A/D converters such that a bank of converters gives a single output to a subsequent device.

The provision of a second input which signals when a conversion is to be commenced allows one or more converters to be synchronized.

In a preferred embodiment of the interface, the interface only comprises four pins, these being the first input, a serial clock input, a start of conversion input and a serial output. This compact interface structure means that an analog to digital converter can be implemented within a 3 or 4 pin digital interface.

Advantageously, when a plurality of A/D converters are serially connected in a daisy chained mode, the output of each A/D converter is serially shifted into and buffered by a succeeding A/D converter and subsequently output therefrom. The length of the buffer need only match the width of the conversion result and hence can be easily implemented by a shift register within the A/D converter. The shift register is, advantageously, capable of being parallel loaded with the conversion result of the analog circuit within the converter.

Advantageously the A/D converter is operable in a still further mode of operation wherein the converter does not assert a signal at its output when the conversion has been completed. This mode can be considered as a "chain, no-ready" mode.

The "chain, no-ready" mode is similar to the "chain, ready" mode of operation, but can be instigated by ensuring that the serial clock input to the converter is in a second predetermined state when the start of convert instruction is issued.

When the converters are connected together in a chain, it is necessary to be able to reset all of them. A reset condition may, for example, be defined such that when the first and second inputs are both low, then the output goes low. It follows that in a chain configuration where the converters have a shared convert (second input) line, it is only necessary to be able to reset the first converter. This can be achieved either by tying its first input to ground or by attaching the first input to the second input. Under these configurations, once the second input goes low the output of the first converter goes low. The output of the first converter is connected to the first input of the second converter and hence the second converter becomes reset and its output goes low. This causes the third converter to see the reset condition and hence a reset propagates along the chain.

Advantageously the converter is further programmable, for example, to perform a calibration or to define whether the data should be clocked out on a rising or falling edge of the serial clock. This list of programming functions is only exemplary and should not be considered to be either essential or exhaustive. Advantageously a programming mode can be implemented by truncating a data read sequence from the device. Thus, in order to implement programming, the analog to digital converter is first instructed to perform a conversion. Once the conversion has been completed, the device will expect the data to be read out therefrom. If, for example, the converter is a sixteen-bit converter, then the converter will expect a read cycle to comprise a minimum of sixteen serial clock cycles. The read may comprise more than sixteen clock cycles because the converter may be connected in a daisy chain manner with other converters, but a complete read can never comprise less than sixteen cycles in this example. Thus, if the read is terminated before sixteen clock cycles have been completed, the converter interprets this as a programming instruction. Different functions of the programming may also then be selected by combinations of signals being set to logical high or low states on either of the first input or second input, in combination with various lengths of clock sequences. The programming sequences may be hierarchical such that one programming sequence may merely indicate the nature of a subsequent programming sequence. It is thus possible to provide a programmable analog to digital converter operable in various modes of operation and having a compact serial interface which can be limited to merely three or four pins including the serial clock and serial out pins.

It will be appreciated that the serial interface described herein, although described in the context of an analog to digital converter, is also suitable for use with other devices whose operation is essentially asynchronous.

According to a second aspect of the present invention, there is provided a serial interface for a task performing device wherein the device will complete the task after an unspecified duration but within a predetermined maximum duration, and wherein the serial interface comprises a serial clock input, a serial output and a control input and the interface is arranged such that a first transition of the control input initiates the task and a further transition of the control input prior to completion of the task instructs the serial interface to assert a signal on the serial output once the task has been completed.

Advantageously the serial output can assume a high impedance state (such an arrangement is generally known as a tri-state output) and during the task the serial output is in the high impedance state and once the task has been completed the serial output exits from the high impedance state to assert a signal to indicate that the task has been completed.

Advantageously the output line from the serial interface is tied to a known voltage level via a resistor. It is common practice for the output to be tied to the positive supply rail and hence the resistor is known as a pull-up resistor. However it would equally be possible to tie the output to the low voltage (ground) rail. Once the task has been completed, the output should then drive towards the opposite state to that imposed by the resistor. Thus, if a pull-up resistor is used, the output goes low to indicate that the task has been completed.

Advantageously data can be read from the serial data out pin in response to transitions on the serial clock pin. When the data out pin has also been used to indicate that the results are ready for conversion, it is necessary to assert an instruction to cause the output to remove the ready signal, and place the first output bit of the data on the output.

Advantageously, once all of the data has been read out, the serial output can assume a known condition. This may, for example, be to revert to a high impedance state.

Advantageously the serial interface is operable in a further mode such that, in the absence of a further transition of the control pin before the completion of the task, the serial output assumes a high impedance condition until such time as the further transition on the control pin occurs. Thus the output can remain in a high impedance state even after the conversion has been completed and will remain in this state until such time user or other devices indicate to the serial interface that they wish to receive data from it.

BRIEF DESCRIPTION OF THE DRAWINGS

The present invention will further be described, by way of example, with reference to the accompanying drawings, in which.

DETAILED DESCRIPTION

Figure 1:
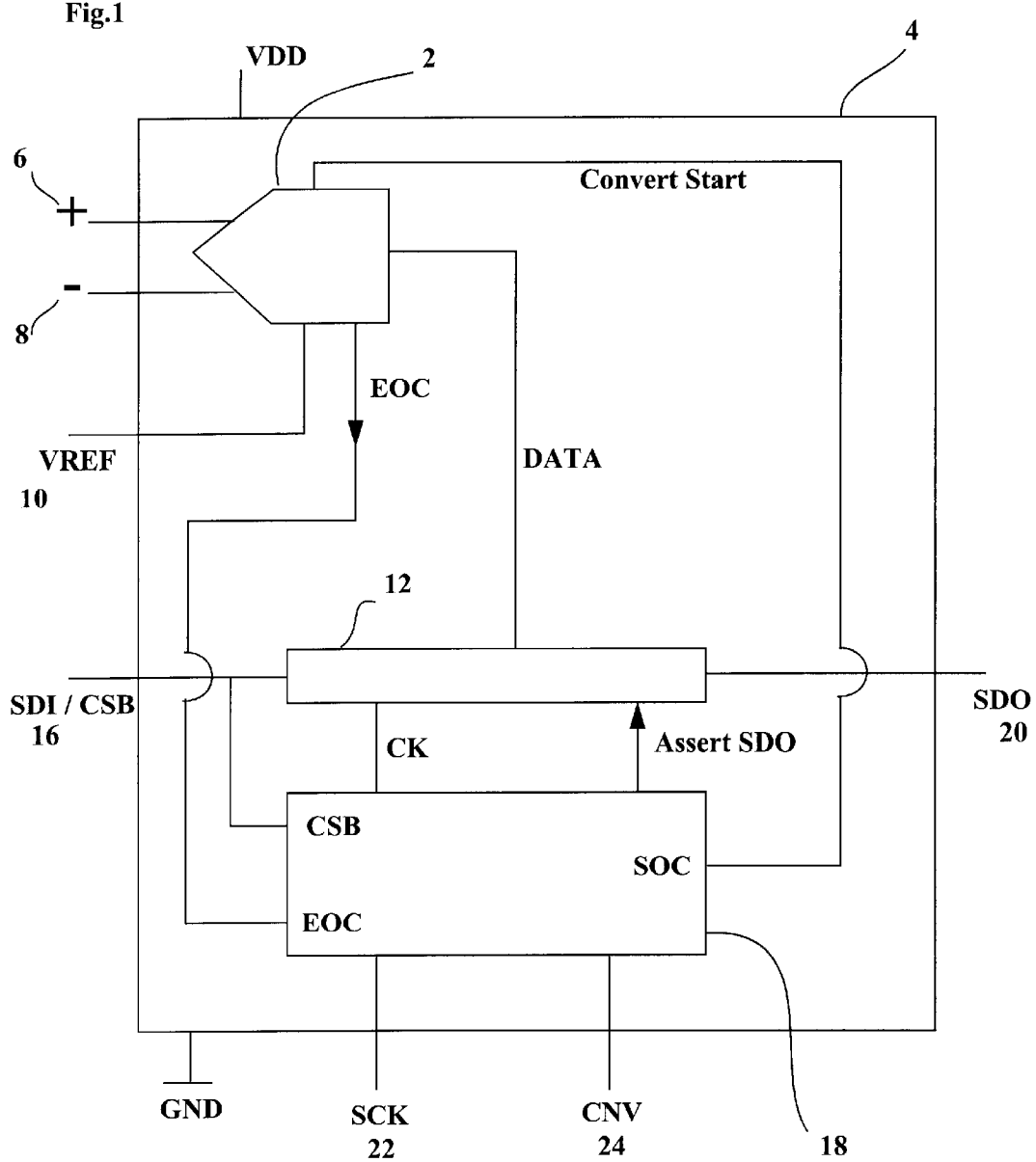
FIG. 1 is a schematic diagram of an analog to digital converter constituting an embodiment of the present invention.

FIG. 1 schematically illustrates an analog to digital converter, generally indicated 4, constituting an embodiment of the present invention. The analog section, generally indicated 2 of the converter, has a non-inverting input 6, an inverting input 8 and a voltage reference input 10. The converter 2 may be formed of any suitable converter technology. The converter 2 works asynchronously and therefore produces the result after a time which is intrinsic to the converter itself, and may vary from converter to converter. However, the manufacturer can guarantee that the conversion result is available after a predetermined time period.

A digitised output of the converter is provided to a buffer 12 which also functions as a shift register. Assuming that the analog to digital converter 2 is a 16 bit converter, then the buffer 12 is composed of a 16 bit shift register which is loadable with the conversion result. A serial data in/chip select bar pin (SDI/CSB) 16 is connected both to an input end of the buffer 12 and also to an internal mode controller 18. An output of the buffer 12 is provided via a serial data out pin (SDO) 20.

The mode controller 18 is also responsive to a serial clock pin (SCK) 22 which can be used to clock the shifting of data out of the serial data out pin 20, and also to a convert (CNV) pin 24 which is used to indicate when a conversion is to be initiated. A transition on the convert pin indicating the commencement of a conversion is passed to the analog to digital control circuitry 2 as a start of convert (SOC) signal in order to cause the signal to be held, for example by a track and hold circuit (not shown) such that the converter can then perform the conversion tasks. Once the conversion is complete, the analog portion sends an end of convert (EOC) signal to the controller 18. The controller also issues an "assert SDO" signal to cause the serial data out pin to exit from a high impedance state.

It is clear that space for pin-out of an integrated circuit is at a premium, and indeed increases in the size of integrated circuit packages may not be permitted if it is desired to maintain backward compatibility with earlier designs. It is therefore important to keep the number of pins required for controlling the circuit to a minimum whilst still enabling the required functionality of the device.

As shown in FIG. 1, the integrated circuit only requires four pins (SDI/CSB, SDO, SCK, CNV) within its digital interface in order to provide both control of the integrated circuit and reading of data from the circuit. Various modes of operation of the circuit will now be described.

Chain Modes

Figure 2:
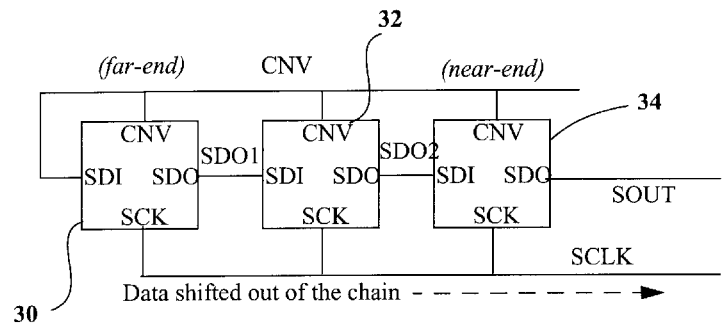
FIG. 2 schematically illustrates a circuit in which a plurality of analog to digital converters are connected in a daisy chain.

FIG. 2 schematically illustrates an arrangement in which a plurality of devices, in this case three, are connected together in a daisy chain. A first device 30 is located at the far end of the daisy chain and has its output SDO connected to the serial input SDI/CSB of a second device 32. In turn, the SDO output of the second device is connected to the SDI/CSB input of a third device 34. Further devices may be included within the daisy chain, but for this example it suffices to only describe the action of three of them. The convert inputs of each of the devices 30, 32 and 34 are wired together in parallel to a CNV bus, and serial clock inputs SCK of each of the devices 30, 32 and 34 are connected to a serial clock bus. The serial output SDO of the third device 34 represents an output to the chain of converters. The analog portions of the converters have been omitted from the diagram for clarity.

In this arrangement, the converters can be set to do simultaneous sampling of the analog inputs supplied to each of the converters. The results of the sampling can then be read out of the converters in a serial form. Thus, in the arrangement shown in FIG. 2, the result of the third converter 34 is read out first, and as the result is read out of the third converter the data from the second converter is serially shifted into the third converter and simultaneously the data from the first converter is serially shifted into the second converter. It will be appreciated that, in effect, only two signals are required to control an arbitrary number of the analog to digital converters. Further, in this arrangement, the converters are arranged to generate a ready signal to indicate that each and every converter in the chain has finished its conversion.

In this mode of operation, it is necessary to signal to the devices that they should assert a ready signal. A ready signal is asserted by asserting the serial data out to a logical 1. However, since the devices are chained each device effectively forms the result of an AND operation performed on the serial data input of the device and an end of convert signal generated by the analog to digital converter section 2 and supplied to the control section 18. Thus, each device only asserts its serial data out pin once it has finished its own conversion and the signal on its serial data input pin is a logical 1. It can be seen from FIG. 2 that some form of action needs to be taken at the first converter 30 in the chain in order to ensure that it sees a logical 1 at its SDI input thereby ensuring that its serial data output assumes a logical 1 as soon as the converter 30 has finished its conversion. It would, of course, be possible for the system designer to tie the serial data input of the device 30 to the $V_{dd}$ supply.

However, it is desirable to be able to reset the converter to a known condition at will. In order to achieve this, it is necessary to define a reset condition. In the present invention, the reset condition is defined when SDI and CNV are both low (logical 0). Upon reset the SDO pin also goes low. Thus in the arrangement shown in FIG. 2 the reset condition ripples along the chain of converters. In order to achieve reset, it is possible, as shown in FIG. 2, to connect the SDI pin of the first converter 30 to the CNV line such that CNV going low causes a reset to occur. Once the reset condition is removed, by taking CNV from a 0 to 1, it is then necessary to signal to the device that it is operating in a chain mode and also whether or not a ready signal is to be asserted once all of the A/D converters have achieved their conversion result. This is achieved, in part, by modifying the architecture of the A/D converters such that a delay is introduced within the SDI path within the converter and also by the status of the serial clock signal. This will be explained more fully with reference to FIGS. 3 and 9.

Figure 9:
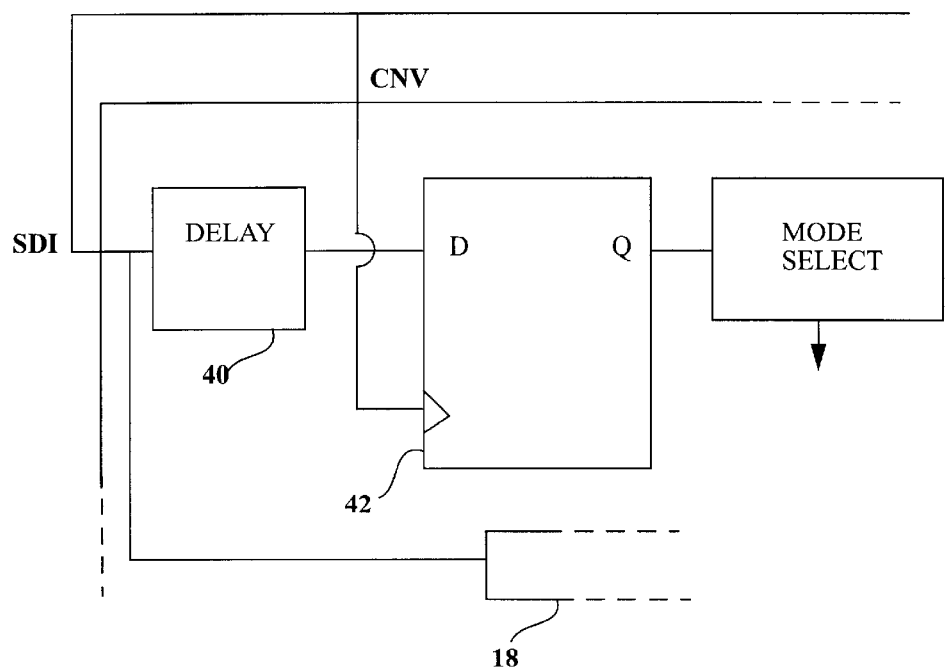
FIG. 9 schematically illustrates part of the mode select circuitry shown in FIG. 1.

Firstly, it will be apparent that, upon releasing the reset condition, it will be useful to know the status of the SDI pin at the time that the reset was released, that is at the time that the CNV goes high or indeed just prior to this event. In order to do this, and as shown in FIG. 9, a delay 40, which may be implemented as a chain of inverters, is introduced between the SDI pin and a D-type flip-flop 42 which is edge triggered by the rising edge transition on the CNV pin. Thus, starting with a condition where CNV is low, and has been held low for a while, it is clear that voltage at the SDI input is low (logical 0) and that the signal on the D input of the D-type flip-flop 42 is also low. This is the reset condition. Reset is then released by asserting a start convert signal on the CNV line which undergoes a low to high transition. As the transition occurs, the input to the inverter chain 40 also goes from low to high. However, the signal at the D input of the D-type 42 is delayed with respect to the transition on the convert line and hence the D input is low at the time of the transition and is clocked by the D-type in order to indicate to the mode selector 18 that it is operating in a chained mode.

Figure 3:
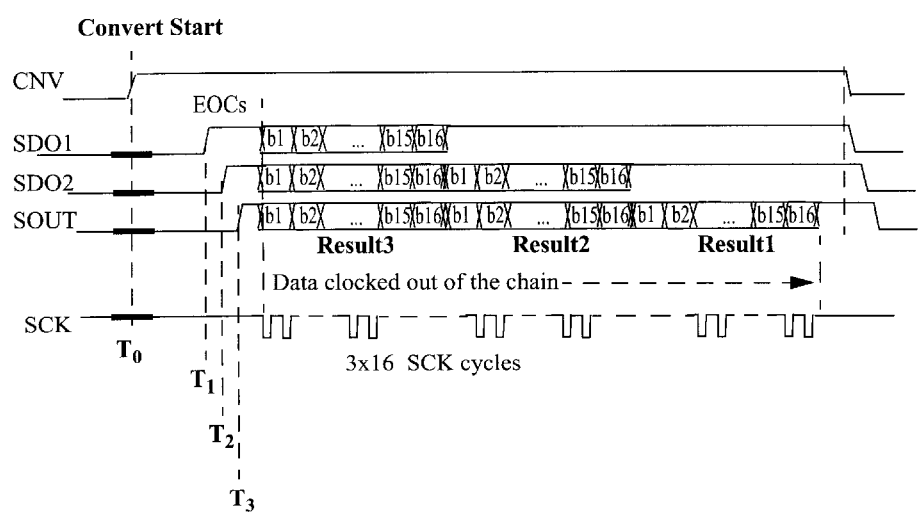
FIG. 3 shows a timing diagram for the arrangement shown in FIG. 2.

FIG. 3 illustrates the timing diagram for chain mode operation where the A/D converter chain is arranged to signal that it is ready to read out data as soon as the conversion results have been produced. The instruction to the A/D converters to signal that the conversion results are ready is given by holding the serial clock input high at the time the start of conversion signal is sent, that is the time that CNV rises from low to high. Thus, in FIG. 3, time $T_0$, when the convert signal undergoes a low to high transition and the serial clock is held high the device is operating in a "signal when ready" mode. Following the time $T_0$, each device then performs its own conversion and does so within a guaranteed time frame. However, the time taken for each conversion result is unknown but is unique to each of the converters 30, 32 and 34.

With reference to FIG. 1, it is seen that each analog to digital converter section 2 has an end of convert signal line (EOC) which is fed from the converter 2 to the control logic 18. Thus the controller 18 is appraised when its associated analog to digital converter has finished performing its conversion. Furthermore, the controller 18 is also responsive to the SDI line and hence knows when the preceding converters have finished their conversions, by virtue of the SDI line going high.

The wiring arrangement around the first converter 30 is such that once it has finished its conversion the controller 18 will then examine the status of its serial data input and determine that the serial data input is now high. As a result of ANDing the serial data input and the end of conversion signal, it will now assert its serial data output. Thus, the serial data input of the second A/D converter 32 will now be high. If the second A/D converter 32 has already finished its conversion, then it will have been waiting for a change in the status of its serial data input and will then change its serial data output from a low to high state. However, if the second A/D converter 32 has yet to finish its conversion, then its serial data output will remain in a low state until the end of conversion signal is asserted within the converter 32. Only then will the serial data output of the second A/D converter 32 change from low to high. Thus, the serial data input of the third A/D converter 34 is now high and it is free to assert its serial data out or in this case "ready" signal once it has finished its own conversion. Thus, irrespective of the order in which the converters 30, 32 and 34 achieve their conversion results, a logical 1 propagates along the converter chain from the far end converter 30 to the near end converter 34 as exemplified by transitions on the serial output lines at times $T_1$, $T_2$ and $T_3$ shown in FIG. 3. Once the ready signal has been received from the serial output of device 34, a subsequent device (not shown) can proceed with the reading of the data out of the chain of converters.

By preference, the A/D converters are set internally such that, on the falling edge of their serial clock they set up the next bit of data to be read out, and on the rising edge of the serial clock that item of data is regarded as having been output from the converter and that they clock data in on their own serial inputs, SDI. Thus, as shown in FIG. 3 the serial clock has hitherto been high. On the first falling edge each of the converters modifies its respective serial output to remove the logical "one" which had previously been there to assert the most significant bit of the data word of the conversion result which is to be read out. On the next rising edge of the serial clock the bit is regarded as having been read out, and on the next subsequent falling edge of the clock the data is shifted so that the current bit is then replaced by the next bit.

As noted in FIG. 1, the output register 12 is a shift register and hence the signal appearing on the serial data input is read into the shift register on each rising clock. In this way, the data can be read out from all of the converters, having been passed amongst them in a daisy chained manner. Thus, in the arrangement shown in FIG. 2, if the converters are 16 bit converters then 3×16=48 serial clock cycles are required in order to read all of the data out of the converter chain.

Figure 4:
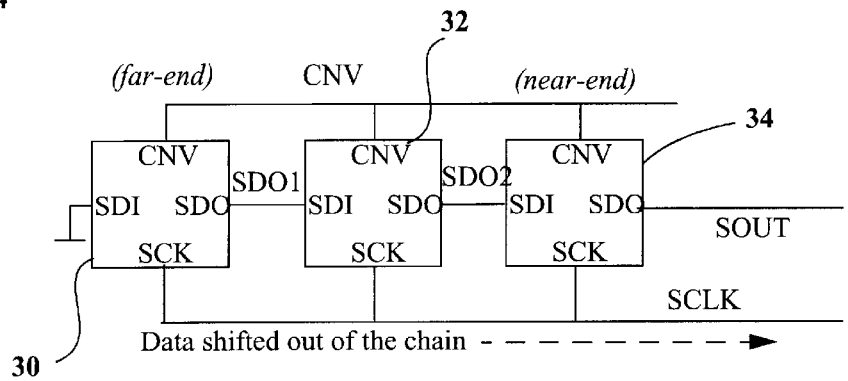
FIG. 4 schematically illustrates an alternative arrangement of daisy chained analog to digital converters in accordance with the present invention.

FIG. 4 shows an alternative configuration for the devices in a chained multi device mode, but in this instance devices are not configured to assert a ready signal, and instead the user has elected to wait the guaranteed conversion period before reading the data from the devices. As was described with reference to FIG. 2, three devices 30, 32 and 34 are arranged in a chain with device 30 representing the far end of the chain and device 34 representing the near end of the chain. The serial out of the device 30 is connected to the serial input of the device 32 and the serial output of the device 32 is connected to the serial input of device 34. The serial output of device 34 represents an output from the converter chain. The A/D converters are configured such that their convert inputs are connected in parallel to a convert control line and their serial clock inputs are connected in parallel to a serial clock control line. However, in contrast to the arrangement shown in FIG. 2, the serial data input of the first converter 30 is now tied to ground rather than being tied to the convert control line.

Figure 5:
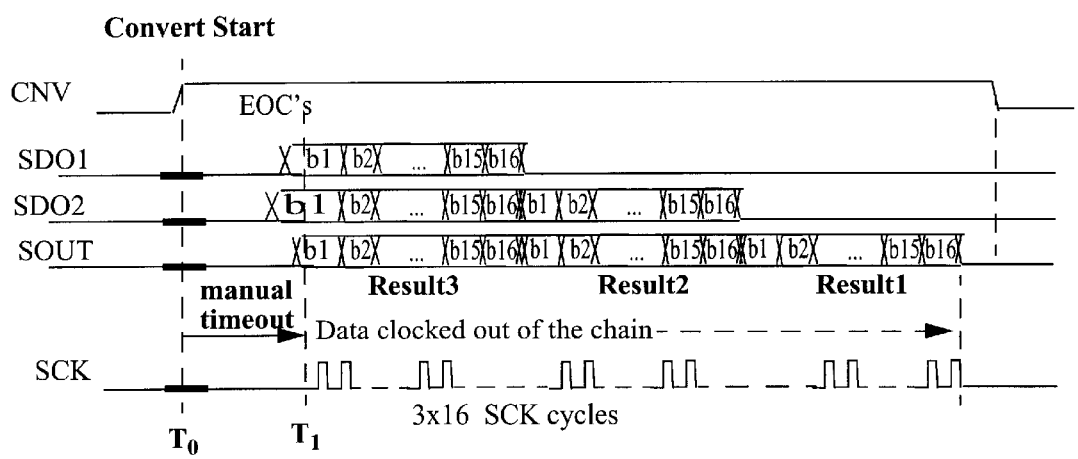
FIG. 5 schematically illustrates a timing diagram for the arrangement shown in FIG. 4.

As before, the reset condition is caused by taking the SDI input and the CNV input to a low (logical 0) condition. As the serial data input from the first device is permanently tied low, the reset condition is achieved each time the convert line is taken low. Since the serial data output of the first device goes low once it is reset, a reset ripples along the chain of converters when CNV goes low. As shown in FIG. 5, a start of conversion is initiated at time $T_0$ when CNV goes high. At this time, the control section of the device examines the inputs in order to determine which mode it should enter. Each device is presented with a low SDI signal on the rising edge of the CNV signal and hence enters the chain mode, as was the case with the arrangement described in FIG. 2. However, as shown in FIG. 5 and in contrast to FIG. 3, the serial clock is held low during the CNV transition from low to high thereby signalling to the A/D converters that although they are configured to operate in a chain mode, they are not to assert the ready signal. Each of the A/D converters will perform the analog to digital conversion at its own rate but within a guaranteed time-out period which ends at $T_1$. In this mode of operation, each of the converters places the value of the first bit of its conversion result on its serial data output as soon as the result is completed. Consequently, the serial data outputs of the converters are set up in a random order. This is schematically illustrated in FIG. 5 where it can be seen that the second converter 32 finishes it conversion first, the first converter 30 finishes its conversion second, and the third converter 34 finishes its conversion last.

At time $T_1$, all the data is set up and ready to be serially read out to the converters as hereinbefore described. As noted hereinbefore the data is set up on negative going transitions and regarded as being read, or indeed captured by the serial data input of the converters where they are connected to receive an output from a preceding A/D converter, on low to high clock transitions. However, as before, the results are then read out by supplying a chain of 48 clock pulses. It will be appreciated if four 16 bit A/D converters were arranged in series, then 64 clock cycles would be needed to read the data out.

Finally, it should be noted with reference to FIG. 5, that the chain progressively fills with 0's as the data is clocked out of the chain. In particular, after 16 clock cycles the data from the first A/D converter 30 has been completely clocked into the second converter 32 and the first converter is now full of 0's. After 32 clock cycles the second and first A/D converters are completely full of 0's, and if more than 48 clock cycles were provided during a read operation, then those cycles over 48 would return a 0 each time.

Figure 10:
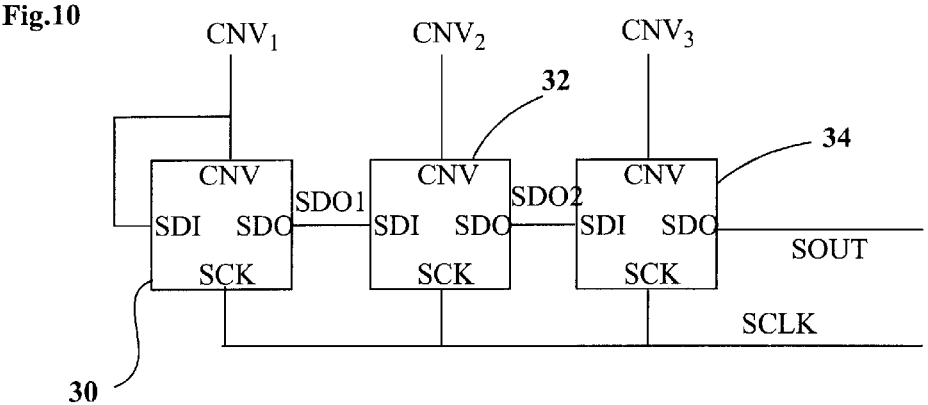
FIG. 10 schematically illustrates a modification to the circuit of FIG. 2.

The two converter topologies shown in FIGS. 2 and 4 have had a common convert signal. However, for the avoidance of doubt, it is also possible to arrange the A/D converter chains such that each individual A/D converter has its own respective convert signal, as shown in FIG. 10.

In this example the serial data input pin of the first A/D converter 30 is tied to the converter line CNV1 of the first converter so as to ensure that a reset condition can be propagated into the chain. However the SDI pin of the first A/D converter 30 could be connected to a switchable device, tied high or tied low depending on the design requirements of the circuit.

Chip Select Modes

Figure 6:
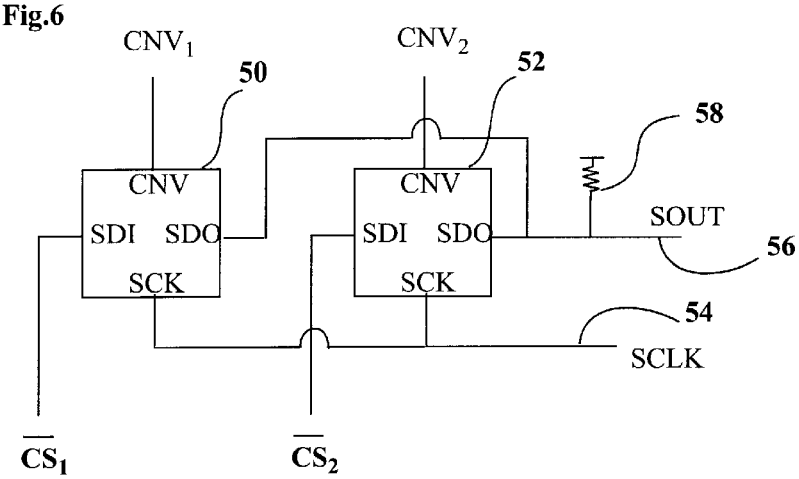
FIG. 6 schematically illustrates an arrangement of analog to digital converters arranged in parallel with one another.

The converter is advantageously operable in other conversion modes as well. A frequently used topology is to have a plurality of converters connected with their serial data outputs arranged in parallel to a single output line. This configuration is shown in FIG. 6 where two A/D converters 50 and 52 are illustrated. As before, the serial clock inputs of the A/D converters 50 and 52 are connected in parallel to the serial clock line 54. However, each serial data input now acts as an individual chip select (active low) CSB input and hence the CSB inputs are individually connected to a selection device (not shown). Since each converter is now connected in parallel to the serial out data line 56 steps must be taken to avoid contention between the devices. This is achieved by the use of TRI-STATE outputs, which are well known to the person skilled in the art and can deliver three output states, namely 0, 1 and high impedance. The system designer has to take steps to ensure that either all of the serial data outputs are in a high impedance state, or that only one can be asserted to send an output to the serial out line 56 at any given time. It is good practise for a weak pull-up resistor 58 to be connected to the serial out line 56 in order to prevent the line floating to the midpoint voltage between the supply rails when all the A/D converters 50 and 52 are in their high impedance state as this might result in excessive power dissipation and damage to a subsequent device having its input connected to the line 56. Each device 50 and 52 has an individually controllable convert input, although they could be connected together if appropriate. The operation of the circuit shown in FIG. 6 will now be described in further detail with reference to FIG. 7.

Figure 7:
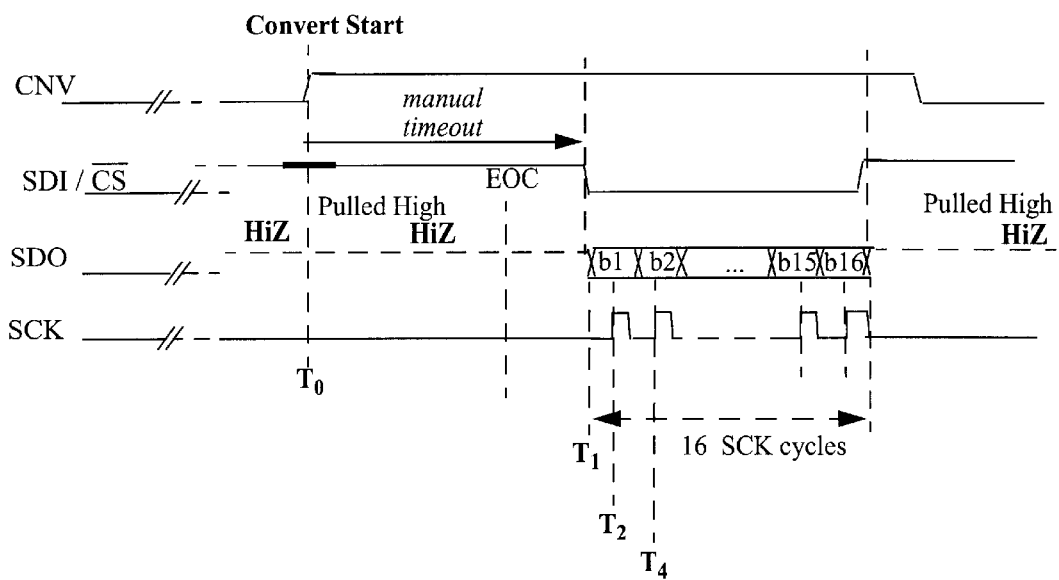
FIG. 7 schematically illustrates a timing diagram for one of the analog to digital converters in the arrangement shown in FIG. 6.

As shown in FIG. 7, and as described hereinbefore, the A/D converters are initially reset by taking their CNV and CSB lines low (ie to logic 0). Although this has potential for all of the outputs SDO to be active, all of the outputs drive low in this time and hence there is no conflict or contention between the outputs. The CSB line of each of the converters 50 and 52 is then taken high thereby exiting the reset state and causing the output stages of converters 50 and 52 to assume a high impedance condition.

When it is desired to start the conversion, the convert line CNV undergoes a low to high transition at time $T_0$. At this time the status of the CSB line is sampled, and since it is high, the converter knows that it is not in a chain mode, but is operating in a chip select mode. Each device then forms it conversion, and the result is guaranteed to be available at time $T_1$. When it is desired to read data out, it is necessary to take the CSB control line of the desired device 50 or 52 low. In this example suppose that it is desired to read data from the A/D converter 52 and hence its CSB line is taken low in order to commence data read at time $T_1$ or later. The ADC is responsive to the serial clock only while CSB is low and the read out of the data is incomplete. After read out is complete the output returns to the high impedance condition.

The system designer has a choice of whether to inhibit the serial clock during the conversion, or to allow the serial clock to run continuously. In terms of analog performance, it is preferable that the serial clock be inhibited until such time as it is actually desired to read the data from the devices. If the serial clock is inhibited, then it makes sense that the serial clock should normally be low. This condition is shown in FIG. 7 where, at time $T_1$ once the CSB (SDI) line goes low the device immediately sets up the first bit b1 on its serial data output. At time $T_2$ corresponding to a rising clock edge of the serial clock the data is then read from the data line 56 and then on the falling edge of the serial clock the next bit b2 is set up and its value read on the next rising edge occurring at time $T_4$. Successive clock cycles are then provided to read the remaining bits out of the converter.

It is also possible that, as with the chain mode of operation, the user wishes to be informed immediately that a selected one of the converters has finished its conversion. This can be achieved by operating the circuit shown in FIG. 6 in a slightly different way. This will be explained more fully with reference to FIG. 8.

Figure 8:
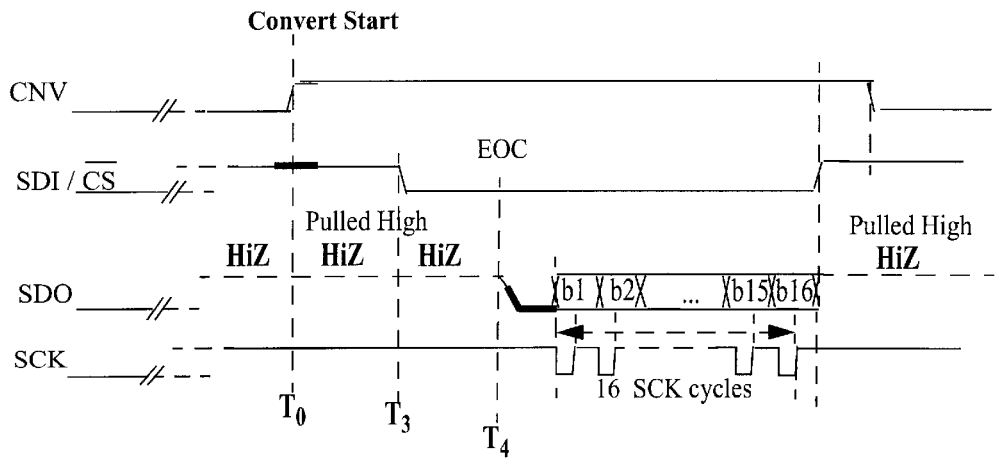
FIG. 8 schematically illustrates a further timing diagram for one of the analog to digital converters in the arrangement shown in FIG. 6 when operated in a further mode.

As before the converters are reset by taking the CNV and CSB lines simultaneously low. When the CSB line is taken high at an undisclosed time preceding $T_0$, the converter exits the reset state which ensures that the output stages are in a high impedance state. At time $T_0$ as shown in FIG. 8, the CNV line (which may be shared or may be individual to each A/D converter) goes high in order to signal the start of a conversion. The status of the CSB line is also sampled at this time, by the arrangement shown in FIG. 9, in order to confirm the mode of the device and to signal that it is operating in a chip select mode by virtue of the SDI/CSB input being high at the start of conversion, as opposed to a chain mode where the SDI/CSB input is low as the start of a conversion. Shortly after $T_0$ the CSB/SDI line is taken low at time $T_3$ whilst the conversion is still in process, thereby indicating to the controller 18 (FIG. 1) that a ready signal should be produced once the conversion result has been derived. In this example, the end of conversion occurs at time $T_4$ and the controller 18 responds by taking the output SDO of the selected device from the high impedance condition to a predetermined signal status, which in this example is low.

As before, the user has a choice of whether to run the serial clock continuously, or to only activate it when he wishes to read data from the converter. If the serial clock is run discontinuously, then following the assertion of the ready signal the first bit of the output result will set up on the next high to low transition of the clock and will be assumed to have been read out on the subsequent low to high transition of the clock. It is therefore sensible, although not essential, that where the clock is run discontinuously that it should be left in a high condition when off. If the clock is being run continuously, then the user must accept the fact that at the next falling clock edge the ready signal will be replaced by the first bit of the data and that at the next rising edge the device will assume that the data has been read out.

It is thus possible to provide an analog to digital converter having a compact serial interface allowing differing modes, in this case four modes of operation to be programmed, and a reset condition to be defined, with only four interface pins.

Advantageously the device is also programmable, and programming or entering a program mode can be initiated by truncating the data read operation before its normal end. That is, for a 16 bit ADC less than 16 clock cycles are provided before a transition on the CNV or SDI/CSB pin is performed in order to indicate that the device is being programmed. It should be noted that where programmability is provided within the device, the program settings must not be reset by the normal reset conditions CNV=SDI=0.

Figure 11:
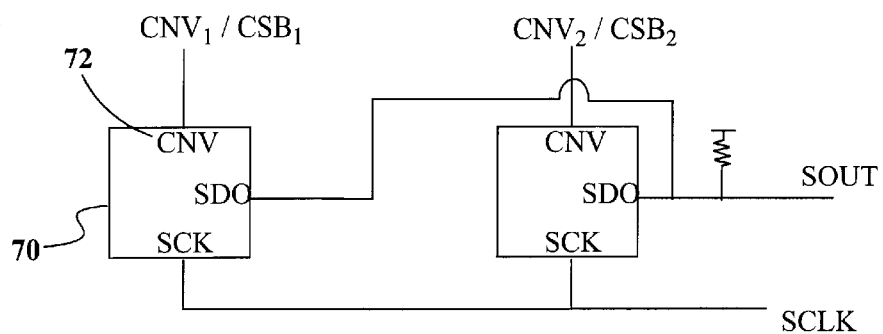
FIG. 11 shows a circuit for a ADC with a 3 pin interface.
Figure 12:
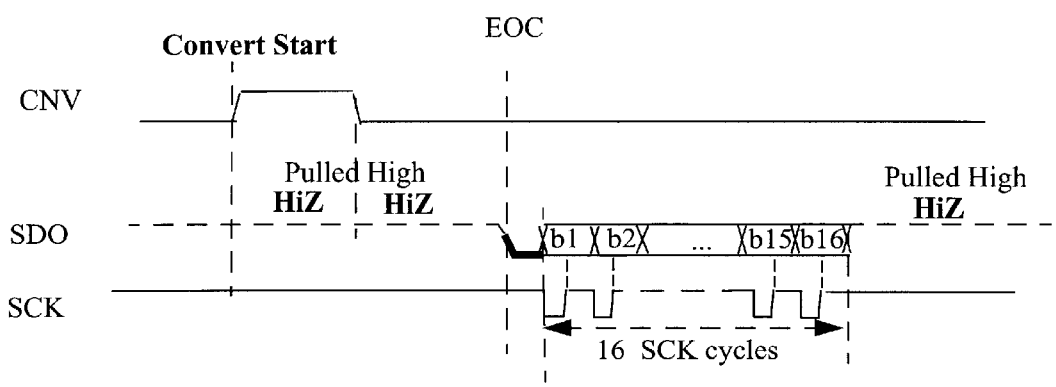
FIG. 12 shows a timing diagram for one of the analog to digital converters in the arrangement shown in FIG. 11 where a "ready" signal is given.

FIG. 11 shows a further analog to digital converter 70 constituting an embodiment of the present invention. This analog to digital converter only has a three pin serial interface. This device is permanently configured into a chip select mode. Thus the start convert and chip select (active low) are controlled by the same pin 72. The serial data out and serial clock functions remains as described hereinbefore. The device can operate in either "chip select, ready" or "chip select, no-ready" modes. The ready mode of operation of this device can be seen more fully with reference to FIG. 12. It can be seen that generally, the serial data out assumes a high impedance condition except when either signalling that a conversion result is ready to be read out from the analog to digital converter, or during the read out of the conversion result. Thus, after a conversion result has been read, the serial data out-pin automatically re-assumes a high impedance condition. In order to initiate a conversion, the convert line is taken from low to high. It will of course be appreciated that the control logic could be inverted. Following the rising edge of the convert line CNV the internal analog to digital conversion process is initiated. However, before the end of the internal analog to digital conversion process, which has a guaranteed minimum time as well as a guaranteed maximum time, the convert line 72 is taken low again thereby signalling to a mode controller that a ready signal should be given. The serial data output remains in its high impedance state during the conversion. However, once the end of conversion signal is internally signalled by the analog to digital converter, the serial interface switches the serial data output pin from a high impedance state to a driving low condition. Again, it will be appreciated by the person skilled in the art that this choice is arbitrary and in some instances it may be desirable to cause the output to drive high. The output then remains low until the serial clock is initiated, with the first falling edge of the serial clock causing the first bit of the output word to be set onto the serial data output.

Figure 13:
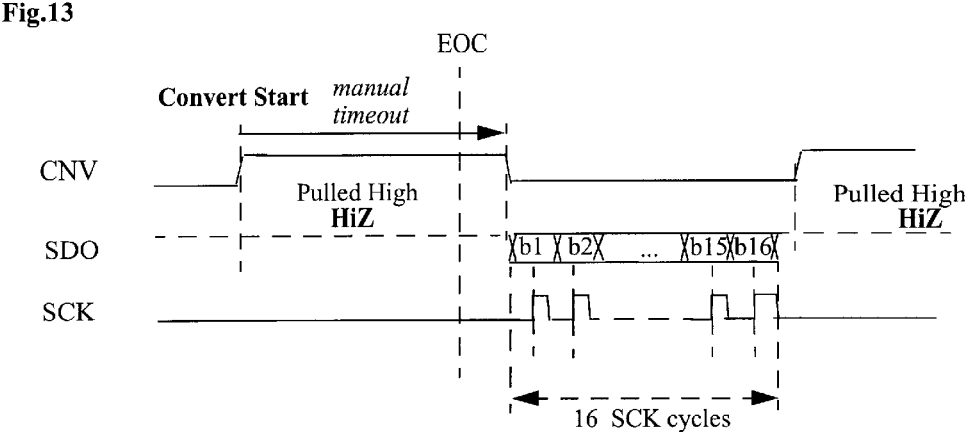
FIG. 13 shows a timing diagram for one of the analog to digital converters in the arrangement shown in FIG. 11 where a "ready" signal is not given.

It will be appreciated that as with the earlier examples, it is also be possible to hold the convert signal high during the entirety of the conversion such that it is still in the high state following the internal end of conversion signal. This is shown in FIG. 13. In this instance, the serial data out remains in its high impedance state until such time as the convert signal is taken low. In this mode the serial data out-pin immediately assumes the state corresponding to the first bit of the data to be read out and thus may be either high or low.

In either event, the data is read out by an appropriate number of serial clock cycles, and once the analog to digital converter 70 has determined that all of its data has been read out it automatically resets the serial data output pin into the high impedance condition.

In addition, this converter can also be programmed in accordance with the previously mentioned truncated readback sequences.

The analog to digital converted having a four pin interface may also be programmable via the SDI input. Thus in "chain mode" (both the "ready" and "no ready" variants) the converters may be programmed by clocking in programming bits serially whilst the chain of converters is clocking out conversion result data. This has the advantage of allowing each device in the chain to be individually programmed. In order to achieve this arrangement shown in FIG. 2 needs to be modified such that the signal applied to the SDI input of the far end converter 30 can be controlled to write in the desired programming codes. A controller for controlling the SDI input of the converter 30 is required to operate such that:

1. The chain can be reset by CNV=SDI=0
2. The far-end ready signal can be set HIGH after Convert Start in order to initiate a READY signal.
3. The programming data can be supplied while data is being clocked out.

The falling edge transition of the convert signal would then indicate to the devices that the programmed settings are to be loaded into the devices.

It is thus possible to provide a versatile interface having low pin out requirements and providing backward compatibility with existing devices whilst also providing enhanced functionality.

What is claimed is:

1. An analog to digital converter comprising a converter section and an interface section, the interface section having a first input and an output from which a digital word representing the result of a conversion can be read, and wherein in a first mode of operation the output is placed into a predetermined output state to signal that the conversion has been completed, and in which the first mode is selected by placing the first input into a first predetermined state before the conversion is complete.

2. An analog to digital converter as claimed in claim 1, in which the first input acts in the first predetermined state as a device select pin for signalling to the analog to digital converter that it is to assert an output signal at its output.

3. An analog to digital converter as claimed in claim 2, in which the output is in a high impedance condition when the device select pin is not in the first predetermined state.

4. An analog to digital converter as claimed in claim 2, in which the first input acts as a start of convert signal.

5. An analog to digital converter as claimed in claim 2, in which a transition of the first input from the first predetermined state to a second predetermined state initiates an analog to digital conversion.

6. An analog to digital converter as claimed in claim 2, further including a second input for initiating a conversion.

7. An analog to digital converter as claimed in claim 6, in which a conversion is started in response to a predetermined transition of a signal applied to the second input.

8. An analog to digital converter as claimed in claim 7, in which the conversion is initiated when the second input goes from a "low" to a "high".

9. An analog to digital converter as claimed in claim 6, in which the converter is reset by a specific combination of signals on the first and second inputs.

10. An analog to digital converter as claimed in claim 9, in which the converter is reset by taking the first and second inputs low concurrently.

11. An analog to digital converter as claimed in claim 1, further including a serial clock input, and in which data is read out from the output in synchronism with clock signals applied to the serial clock.

12. An analog to digital converter as claimed in claim 1, in which the first predetermined output state is a "low".

13. An analog to digital converter as claimed in claim 1, in which in a second mode of operation the output of the analog to digital converter remains in a high impedance state until such time as the converter is instructed to output its data upon receipt of a device select signal.

14. An analog to digital converter as claimed in claim 1, in which the analog to digital converter further comprises a second input and a serial clock input, and wherein following the initiation of a conversion by applying a start of convert signal to the second input the converter examines the status of its first input and the serial clock input, and if the first input is in the first predetermined state and the serial clock input is in a first predetermined serial clock state, then the analog to digital converter enters a third mode where the output is asserted to a third mode predetermined output state to signal that a conversion has been completed when the conversion has been completed and the first input is in a second predetermined state.

15. An analog to digital converter as claimed in claim 14 wherein, in the third mode, the first input further functions as a serial data input, and wherein a plurality of M converters can be connected in series with the output of an Nth converter being connected to the serial data input of an N+1th converter, and the output of the N+1th converter only signals that a conversion is completed when it and all preceding analog to digital converters have completed their conversions, and where N is an integer in the range 1 to (M−1).

16. An analog to digital converter as claimed in claim 14, wherein the a digital interface thereof only has four connections for interfacing the analog to digital converter with other devices.

17. An analog to digital converter as claimed in claim 14, in which the first input further functions as a serial data input such that data appearing at the serial data input is shifted into a shift register within the analog to digital converter for subsequent output.

18. An analog to digital converter as claimed in claim 14 in which the analog to digital converter is further operable in a fourth mode in which the converter is operable in a chain of serially connected converters but the converter does not assert a ready signal when the end of conversion is received.

19. An analog to digital converter as claimed in claim 14, in which the third mode is a "chain, ready" mode in which the converter is connected in series with other converters and asserts an output when it and any preceding converters have completed their conversions irrespective of whether the converter is operable in a second mode.

20. An analog to digital converter as claimed in claim 1, in which the analog to digital converter further comprises a second input and a serial clock input, and wherein following the initiation of a conversion by applying a start of convert signal to the second input, the converter examines the status of its first input and the serial clock input, and if the first input is in the first predetermined state and the serial clock input is in a second predetermined serial clock state, then the analog to digital converter enters a fourth mode where it clocks data at the first input into a shift register for subsequent output and where the output does not assert a signal to indicate that a conversion is complete.

21. An analog to digital converter as claimed in claim 1, in which the analog to digital converter can be programmed by truncating a data read instruction cycle before all of the conversion result has been output.

22. An analog to digital converter as claimed in claim 1, wherein the first input is a serial data input and wherein the analog to digital converter further comprises a clock input and a convert input for initiating a conversion, and the analog to digital converter is programmable by inputting a control word via the serial data input.

23. An analog to digital converter comprising a converter section and an interface section, the interface section having a first input and an output for outputting the result of a conversion, and wherein in a first mode the output is asserted to a first predetermined state to indicate that the conversion has been completed when the conversion has been completed and the first input is at a first predetermined input state.

24. An analog to digital converter as claimed in claim 23, in which the converter further includes a clock input, and the conversion result is output in response to transitions of a clock signal at the clock input between a first and a second predetermined state.

25. An analog to digital converter as claimed in claim 24, where the converter further includes a convert input which initiates a conversion.

26. An analog to digital converter as claimed in claim 25, where the digital interface only has four connections.

27. An analog to digital converter as claimed in claim 25, in which the first mode is selected by examining the status of the first input and the clock input following the initiation of a conversion, and a predetermined combination of signals on these inputs indicates that the first mode is to be selected.

28. An analog to digital converter as claimed in claim 27, in which the first mode is selected when the first input is low and the clock signal is high.

29. A converter as claimed in claim 25, in which a reset condition is defined by the first input being in a predetermined state and the convert input being in a predetermined state.

30. A converter as claimed in claim 29, in which the reset condition is defined by the first input and the convert input being in the same state.

31. A converter as claimed in claim 30, in which the reset condition is defined by the first input and the convert input both being in a logic "0" state.

32. A converter as claimed in claim 25, in which a time delay is inserted in the first input signal path within the converter such that a record of the first input status can be latched in response to a transition of the convert input.

33. A converter as claimed in claim 24, in which the converter includes a mode controller which examines the status of the clock input to determine whether a ready signal is to be given when the conversion has been completed.

34. A converter as claimed in claim 33, in which a "signal when ready" mode in which the converter outputs a signal to indicate when it has completed a conversion is selected by the clock input being high when a convert signal is asserted.

35. An analog to digital converter as claimed in claim 23, wherein, in the first mode, a plurality of converters can be connected in series with the output of an Nth converter being connected to the first input of an N+1th converter, and the output of the N+1th converter only signals that the conversion is complete when it and all preceding converters have competed their conversions, where the converters are numbered 1 to N+1.

36. An analog to digital converter as claimed in claim 35, in which while reading data in the first mode, the converters operate in a chained manner such that data appearing at the first input is shifted into a shift register within the converter for subsequent output.

37. An analog converter as claimed in claim 23, in which the converter is operable in a second mode of operation, in which the first input is in a second predetermined state, and the converters are connected in a chain but the converters do not assert a ready signal when the end of the conversion is achieved.

38. An analog to digital converter as claimed in claim 37, in which the analog to digital converter further includes a clock input and a convert input, and the status of the first input and the clock signal following initiation of a conversion is examined, and the second mode is selected in response to a predetermined combination of signals on these inputs.

39. An analog to digital converter as claimed in claim 38, in which the second mode is selected when the first input is low and the clock signal is low.

40. A serial interface for a task performing device wherein the device will complete the task after an unspecified duration but within a predetermined maximum duration, and wherein the serial interface comprises a serial clock input, a serial output and a control input and the interface is arranged such that a first transition of the control input initiates the task, and a further transition of the control input prior to completion of the task instructs the serial interface to assert a signal on the serial output once the task has been completed.

41. A serial interface for a task performing device as claimed in claim 40, in which the serial output can assume a high impedance state, and in which during performance of the task the serial output assumes a high impedance state, and once the task has been completed the serial output exits from the high impedance to assert a signal to indicate that the task has been completed.

42. A serial interface for a task performing device as claimed in claim 40, in which the serial output goes "low" to signal that the task has been completed.

43. A serial interface for a task performing device as claimed in claim 40, in which completion of the task results in the production of digital data, and the data can be output via the serial output in response to a pulse train applied to the serial clock input.

44. A serial interface for a task performing device as claimed in claim 43, in which once the data has been read out the serial output is placed in a predetermined state.

45. A serial interface for a task performing device as claimed in claim 43, in which once the serial data has been read out the serial output is placed in a high impedance state.

46. A serial interface for a task performing device as claimed in claim 44, wherein in the absence of a further transition of the control input before the completion of the task the serial output assumes a high impedance condition until such time as a transition on the control input occurs.

47. A serial interface for a task performing device as claimed in claim 46, in which in response to the transition of the control input after the completion of the task, data is read out from the serial output, with the first bit of the data being set up on the serial output in response to the transition.

48. A serial interface for a task performing device as claimed in claim 40, in which the first transition takes the control input from low to high.

49. A serial interface for a task performing device as claimed in claim 40, in which the second transition takes the control pin-input from high to low.

50. A serial interface for a task performing device as claimed in claim 40, wherein the interface further comprises a second input and the interface is operable in a further mode of operation where a signal on the output is only asserted when both the device has completed its task and the second input is at a predetermined state.

51. An analog to digital converter including a serial interface as claimed in claim 40.

* * * * *

UNITED STATES PATENT AND TRADEMARK OFFICE
CERTIFICATE OF CORRECTION

PATENT NO. : 6,703,961 B2
DATED : March 9, 2004
INVENTOR(S) : Mueck et al.

It is certified that error appears in the above-identified patent and that said Letters Patent is hereby corrected as shown below:

Column 16,
Line 28, "claim 44" should read -- claim 40 --.
Line 42, "pin-input" should read -- input --.

Signed and Sealed this

Eighteenth Day of May, 2004

JON W. DUDAS
*Acting Director of the United States Patent and Trademark Office*